G. H. CURTISS.
SPEED SCOUT AEROPLANE.
APPLICATION FILED DEC. 22, 1916.
1,316,279.
Patented Sept. 16, 1919.
2 SHEETS—SHEET 1.
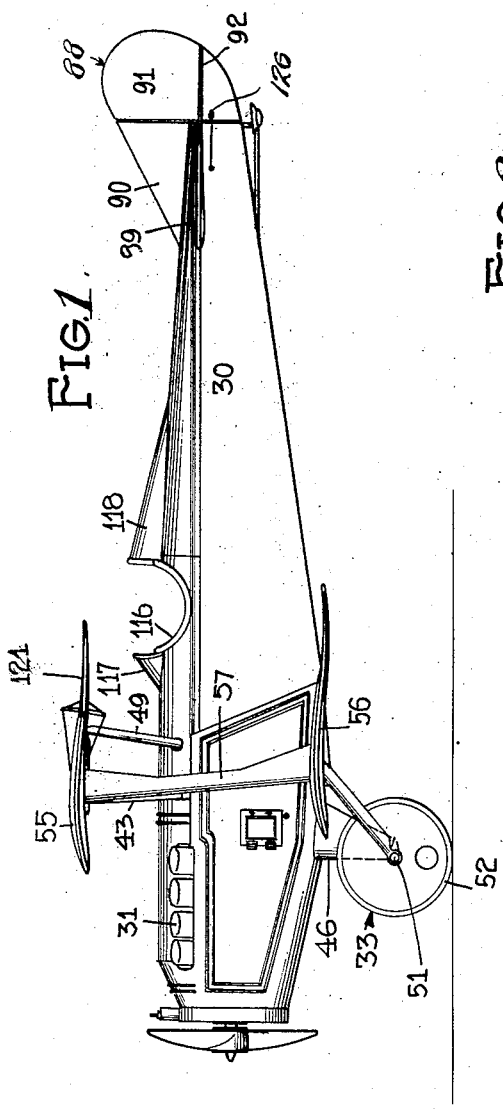
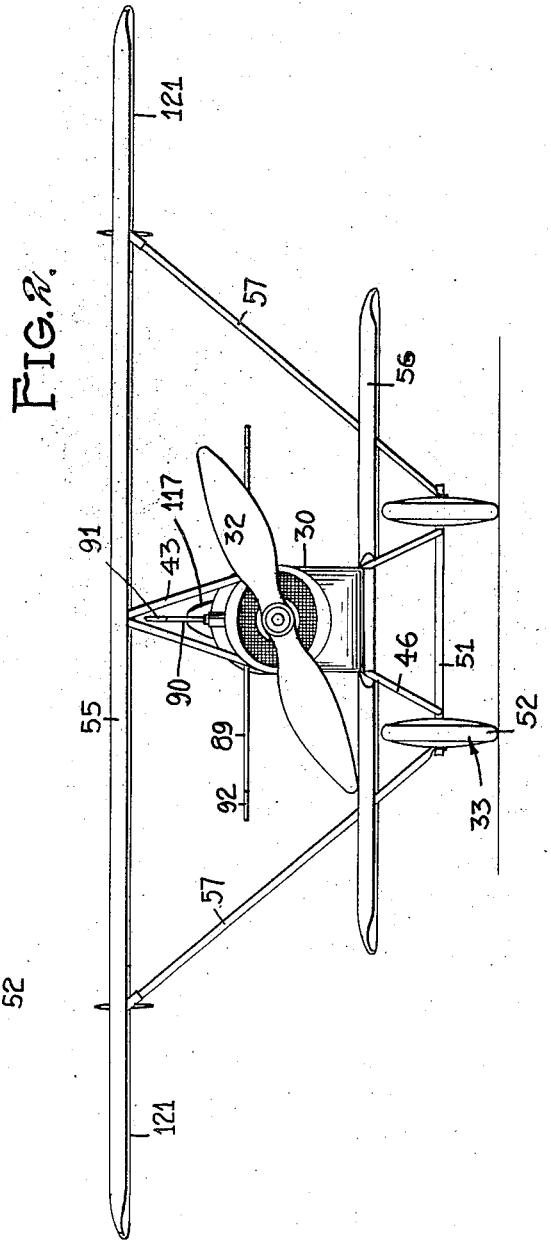
Inventor
GLENN H. CURTISS
By John P. Tarbox
Attorney

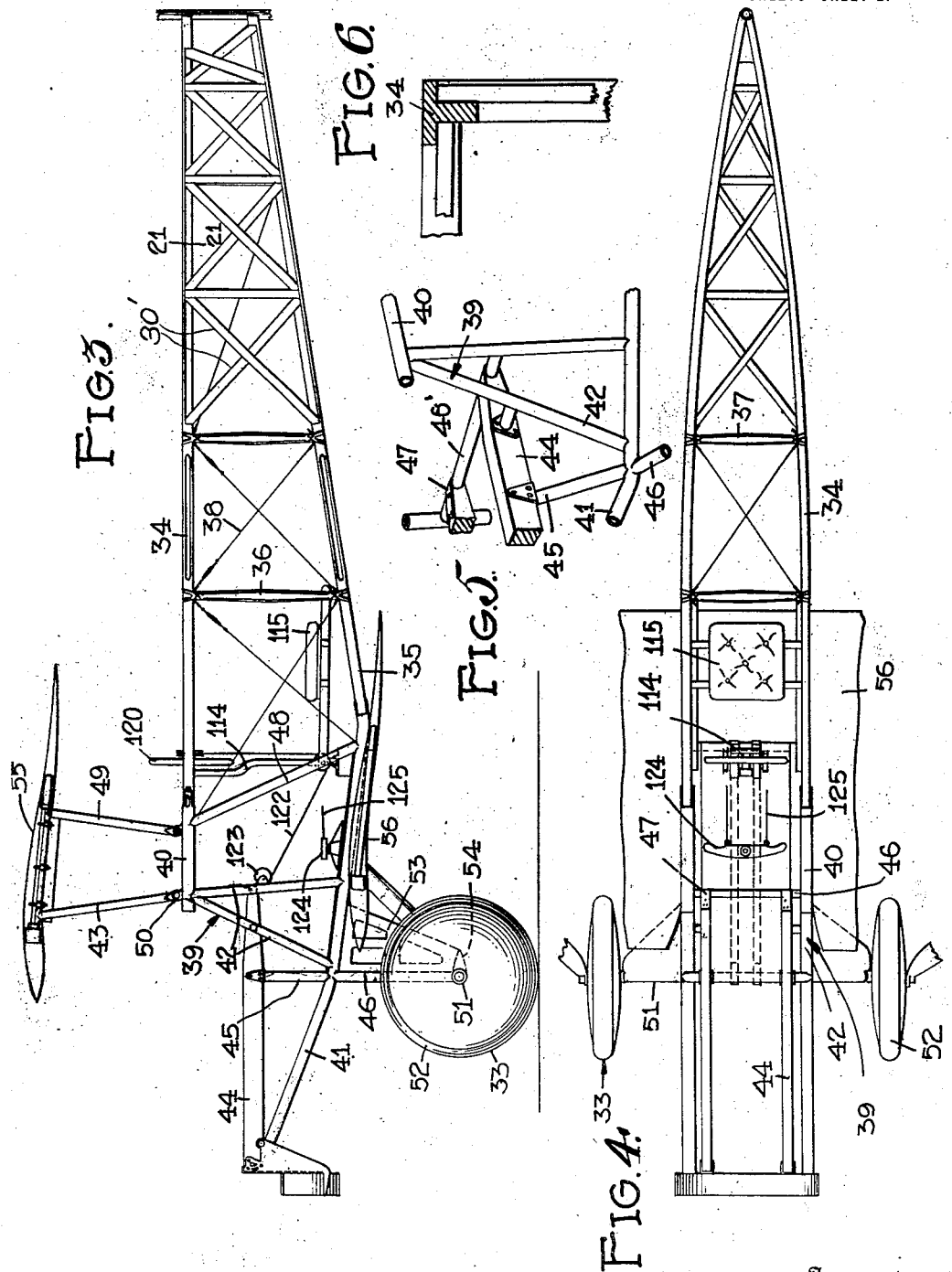

UNITED STATES PATENT OFFICE.

GLENN H. CURTISS, OF BUFFALO, NEW YORK, ASSIGNOR TO CURTISS AEROPLANE AND MOTOR CORPORATION, OF BUFFALO, NEW YORK, A CORPORATION OF NEW YORK.

SPEED SCOUT-AEROPLANE.

1,316,279.   Specification of Letters Patent.   Patented Sept. 16, 1919.

Application filed December 22, 1916. Serial No. 138,499.

*To all whom it may concern:*

Be it known that I, GLENN H. CURTISS, a citizen of the United States, residing at Buffalo, in the county of Erie and State of New York, have invented certain new and useful Improvements in Speed Scout-Aeroplanes, of which the following is a specification.

My invention relates to aircraft and has reference more particularly to speed scout machines designed for military reconnaissance.

Speed is the prime desideratum of reconnaissance machines. Aeroplanes utilized for scout purposes are often unarmed and unarmored, small, and characterized by an absence of flight resisting surfaces. Each and every exposed part of the craft is streamlined, (if possible), the wing spread and fuselage size reduced, and in fact, all elements except essentials either eliminated or removed from view.

It is proposed therefore, by the present invention; first, to minimize the number of interwing posts without decreasing the factor of safety; second, minimize the number of landing gear or chassis struts; third, interbrace the lower plane and landing gear axle without affecting the removability of the axle; fourth, lighten perceptibly the foundations for the several planes; fifth, construct the engine section of the fuselage and the landing gear mounting as an integral structure and of metal parts; sixth, improve considerably the construction and arrangement of the empennage; seventh, reconstruct and lighten the tail skid and adjacent portions of the fuselage; and finally, strengthen and generally improve the details of the entire machine.

In the drawings, wherein like reference characters designate like or corresponding parts:

Figure 1 is a side elevation of the improved speed scout machine;

Fig. 2 is a front end elevation;

Fig. 3 is an elevation of the fuselage assembly, the landing gear and the supporting planes;

Fig. 4 is a plan view (partly broken away) of the machine as illustrated in Fig. 4;

Fig. 5 is a fragmentary perspective view detailing a portion of the engine section of the fuselage, and Fig. 6 is an enlarged section on the line 21—21 of Fig. 3.

In the embodiment of my invention selected for illustration, 30 designates in its entirety the fuselage or body of the craft, 31 the motor, 32 the propeller and 33 in its entirety the landing gear.

The fuselage 30 preferably comprises upper rearwardly tapering longerons 34, lower correspondingly tapering and upwardly inclined longerons 35, vertical fuselage struts 36 and horizontal fuselage struts 37, said struts, with lift and drift wires 38, bracing the widened or enlarged portion of the fuselage. Throughout the greater portion of their length the upper longerons 34 are constructed of wood, lightened toward the rearward end of the fuselage. Such portions of the longerons 34 and 35 as constitute a part of the engine section of the fuselage have been constructed of metal (tubing preferred).

At its extreme after end the fuselage is trussed and the longerons interbraced by wooden slats 30' cross-arranged. These slats not only take up tension stresses at the fuselage extremity, but withstand compression stresses, are cheaper and lighter, and eliminate entirely the costly fuselage clips heretofore used. The longerons 34 and 35 are shaped in cross-section to facilitate securement of both vertical and horizontal slats. (See Fig. 6.)

The engine section of the fuselage, designated in its entirety by the numeral 39, is constructed entirely of metal tubing preferably integrally united. The metal portions of the upper longerons 34 I have designated 40 and the metal portions of the lower longerons 35 I have designated 41. By reference to Fig. 3 it will be noted that the metal portions of the lower longerons extend forwardly considerably beyond the corresponding portions of the upper longerons 34 to provide a foundation or support for the motor 31.

Substantially A-arranged fuselage posts 42 (constructed of metal tubing) interconnect the upper and lower longerons in a plane perpendicular to the line of flight. These posts indirectly support the rear end of the engine bed designated 44. The bed, intermediate its ends, is supported by tubular braces 45 formed as an integral part of the engine section 39 and as angular continuations of chassis struts 46. At its forward end the engine bed is supported by the metal portions 41 of the lower longerons. The brunt of the weight of the motor however, is borne by the intermediately located engine bed braces or supports 45.

By the structure disclosed an ample factor of safety at the engine section of the fuselage is provided. Each unit of the engine section is constructed of metal tubing arranged to constitute an integral structure throughout. A cross brace 46', interconnecting opposed fuselage posts 42, directly contacts the rear end of the engine bed 44. Clips 47 (see Fig. 5) provide an appropriate fastening means for the cross brace.

Aft of the fuselage posts 42, rear fuselage posts 48 (also of metal tubing) interconnect the upper and lower longerons. These posts likewise lie in a plane at an angle to the line of flight. Both the forward center wing posts 43 and the rear center wing posts 49 engage the metal section of the fuselage. The connection at the point referred to I have designated 50 (see Fig. 3).

As intimated, the landing gear 33 or rather the mounting therefor, is constructed as an integral part of the engine section 39. The struts 46 extend angularly outwardly and downwardly from the lower longerons of the fuselage for rigid securement to the landing gear axle 51. The axle (see Fig. 2) is of a length sufficient to extend out laterally considerably beyond the chassis strut terminals, the extended portions mounting landing gear wheels 52 which I prefer to construct in spring wheel form because of the absence of shock absorbers or other cushioning means.

Fairing 53, of sheet metal, is made an integral part of the chassis struts 46 and the metal portion 41 of the lower longerons to function also as a brace for the landing gear and more particularly the landing gear or chassis struts. Said fairing 53 and the struts 46 are both to be inclosed in fabric. Moreover, the axle 51 is streamlined and the fairing 53 braced by fairing 54. By the foregoing arrangement the number of chassis struts is reduced and the fairing for each strut utilized as a landing gear brace.

The supporting surfaces or wings of the aeroplane I have designated respectively 55 and 56, the former, 55 having the greater span. Both wings or planes (the machine being of the biplane type) extend transversely across the fuselage at the engine section thereof, one above and the other below the longerons. A total elimination of all lift and drift wires intermediate the planes may be described as a fundamental characteristic of the machine.

In addition to the center wing posts 43 and 49, there are but two wing posts 57, the said posts being arranged respectively symmetrically at opposite sides of the fuselage 30, each post extending at an oblique angle to the supporting planes with the lower terminals of respective posts in closer proximity to the sides of the fuselage than the upper extremities thereof.

In further explanation of Fig. 6 it may be stated that the longerons 34 and 35 at their rearward extremities are of substantially T shape in cross section. The ends of the cross slats 30' bear directly against the cross heads of the longerons which they interconnect. These slats are relatively thin and at their points of intersection are slightly bowed so as to cross one another without being notched. The fuselage struts throughout that portion of the fuselage defined by the T shaped longeron portion are wider and larger than the slats 30' and have their ends shaped to abut both the cross head and the stem of the T. Not only is the use of fittings thus eliminated but the longeron made lighter as a result.

The empennage of the craft designated in its entirety by the numeral 88 comprises the usual horizontal stabilizer 89, vertical stabilizer 90 and directional control planes 91 and 92, the latter consisting of a rudder centrally disposed and elevator flaps symmetrically disposed at opposite sides of the rudder.

The control of the machine is obtained through manipulation of a column 114 disposed immediately aft of the engine section in convenient proximity to a seat 115 located in the cockpit 116 of the craft. A wind shield 117 is disposed in advance of the cockpit to protect the pilot or aviator and a streamline excrescency 118 aft of said cockpit to continue the lines of the aviator's head rearwardly in streamline form. The fuselage frame is, of course, entirely covered, with fabric preferably, except at its forward end. A sheet metal covering at said forward end is arranged to inclose the motor.

A steering wheel 120 mounted at the free end of the control column 114 is operable to effect control of the ailerons 121. The aileron leads 122 extend from the wheel to the base of the column 114 and thence forwardly interiorly of the fuselage to the pulley 123.

From the said pulley the leads extend upwardly and thence laterally to the ailerons, preferably interiorly of the tubular or hollow members (not shown) included in the wing structure of the machine. Lateral control is obtained through operation of a foot bar 124 mounted in advance of the control column. Rudder leads 125 extend rearwardly from the terminals of the said bar 124 to lever arms 126 extending laterally from opposite faces of the rudder 91. These leads are inclosed entirely in the fuselage except for a very small portion of their length at the extreme after end of the machine. The control of the elevator flaps 92 is obtained through oscillation of the control column. Elevator control leads (not shown) extend rearwardly from said column to pulleys located interiorly of the fuselage at its tail end. From the pulleys the leads continue to a curved lever arm secured to the elevator post equidistant from its ends. A metal stern post 130 forms a part of the fuselage and interconnects the upper and lower longerons at a point where the said longerons abut.

It will be noted from the structure disclosed that the exposed surfaces have been eliminated in so far as possible and inclosed devices substituted to secure strength. This is particularly true as regards the wing structure which is stripped of all lift and landing wires. For obvious reasons the wing beams of the lower wing extend uninterruptedly beneath the fuselage without a break in their continuity. By this arrangement the lower supporting surface is strengthened without increasing the number of its parts. The landing gear also is stripped to the utmost of exposed struts and the fairing constructed to function also as braces. A portion of the fuselage is constructed as an integral whole and of metal tubing and the remaining portion entirely of wood. This arrangement gives strength where strength is needed most and lightness at the tail. These and many other features characterize the machine and make for an increase of speed.

While in the foregoing I have utilized more or less detail forms of construction in presenting the preferred embodiment of my invention, it is desired to point out that certain constructional changes may be made from time to time without in any way departing from the original spirit of the invention as set forth in the subjoined claims.

What is claimed is:

1. In a airplane fuselage, longerons having a rectangular cross section and an angular cross section throughout different portions of their length, and braces connecting with the longerons, the braces throughout such portions of the length of the longerons as are characterized by annular cross section being seated in the angles thereof.

2. In an airplane fuselage, longerons having a rectangular cross section and a cross section substantially T shaped throughout different portions of their length, together with braces cross connecting adjacent longerons, the ends of the braces abutting the crossheads of the T-shaped portions of the longerons.

3. In an airplane fuselage, longerons having an angular cross section and braces connecting with the longerons, the ends of the braces being seated in the angles thereof.

4. A fuselage for airplanes including longerons of varying cross section, the cross sectional shape of the longerons being respectively substantially rectangular and substantially T-shaped, the T-shaped portions of the longerons constituting lightened rearward continuations of the rectangular portions thereof.

5. A fuselage for airplanes including upper longerons and lower longerons, the upper longerons being substantially T-shaped in cross section and the lower longerons substantially inverted T-shaped in cross section.

6. In an airplane fuselage, longerons having an annular cross section and slats interconnecting said longerons, the ends of the slats being seated in the angle of the longerons.

7. An airplane fuselage including longerons of unequal length, the lower longerons being the longer, vertical fuselage struts arranged to diverge downwardly from the upper longerons to the corresponding lower longerons, an engine bed, and braces extending upwardly from the points of connection between the lower longerons and the forward struts of the diverging fuselage struts, the arrangement of the braces being such that they constitute with the lower longerons a dual support for the engine bed.

8. An airplane fuselage including longerons constructed partly of metal and partly of wood, the metal portion of the longerons defining that section of the fuselage constituting the engine section; supporting surfaces, a landing gear and an engine bed; said airplane parts being directly connected to the engine section, braces extending upwardly and inwardly from the lower longerons for the support of the engine bed, and fuselage struts extending divergently downwardly from the upper longerons to the corresponding lower longerons, the braces and the forward struts of the diverging fuselage struts being fastened to the lower longerons in the immediate vicinity of the points of attachment of the struts of the landing gear.

9. An airplane fuselage including upper and lower longerons, an engine bed supported at its forward end by the lower longerons, the rearward terminus of the engine bed being carried into the fuselage beyond the forward end of the upper longerons, fuselage struts extending forwardly and downwardly from the upper longerons to the lower longerons; and braces extending upwardly and inwardly from the lower longerons at the points of attachment of the inclined fuselage struts thereto, said braces constituting with the lower longerons a dual support for the engine bed.

In testimony whereof I affix my signature.

GLENN H. CURTISS.